(12) United States Patent
Kim

(10) Patent No.: US 8,906,180 B2
(45) Date of Patent: Dec. 9, 2014

(54) DECORATIVE STAINLESS STEEL ROLLED SHEET WITH EMBOSSED PATTERNS AND METHOD OF MANUFACTURING THE SAME

(71) Applicant: Daejin DSP Co., Ltd., Gyeongsangnam-do (KR)

(72) Inventor: Jin Hyung Kim, Seoul-Si (KR)

(73) Assignee: Daejin DSP Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 13/854,300

(22) Filed: Apr. 1, 2013

(65) Prior Publication Data

US 2013/0276965 A1 Oct. 24, 2013

Related U.S. Application Data

(62) Division of application No. 12/901,798, filed on Oct. 11, 2010, now Pat. No. 8,455,075.

(51) Int. Cl.
*B29C 59/04* (2006.01)
*B32B 7/06* (2006.01)
(Continued)

(52) U.S. Cl.
CPC . *B32B 38/06* (2013.01); *B32B 7/06* (2013.01); *B29C 59/046* (2013.01); *B29C 66/45* (2013.01); *B32B 2305/20* (2013.01); *B32B 2451/00* (2013.01); *B32B 7/12* (2013.01); *B32B 38/08* (2013.01); *B29C 65/40* (2013.01); *B32B 2309/105* (2013.01); *B32B 15/20* (2013.01); *B29C 65/524* (2013.01); *B32B 15/18* (2013.01); *B29C 65/4815* (2013.01); *B32B 15/08* (2013.01); *B29C 66/71* (2013.01); *B32B 37/12* (2013.01); *B32B 5/022* (2013.01); *B29C 66/74283* (2013.01); *B32B 2311/30* (2013.01)

USPC .......................... 156/209; 156/242; 156/247

(58) Field of Classification Search
CPC .... B29C 59/026; B29C 59/046; B29C 59/02; B29C 59/00; B29C 59/005
USPC ........................................ 156/209, 219, 220
See application file for complete search history.

(56) References Cited

U.S. PATENT DOCUMENTS 3,272,898 A * 9/1966 Knee .............................. 264/119
3,935,338 A * 1/1976 Robertson .................. 427/208.4
(Continued)

FOREIGN PATENT DOCUMENTS

JP 55086626 A * 6/1980
JP 04090327 A * 3/1992
(Continued)

OTHER PUBLICATIONS

Machine translation of Japanese Patent Publication No. JP-2521457B2, originally published Aug. 1996, 6 pages.*

(Continued)

*Primary Examiner* — William Bell
(74) *Attorney, Agent, or Firm* — Michael J. Striker

(57) ABSTRACT

A decorative stainless steel rolled sheet has an embossed pattern, suitable for use as a surface finish or an interior surface finish of products, wherein a thin stainless steel sheet subjected to surface treatment including nanoceramic coating or PVD ionic coating resulting in various colors and a release sheet alone or with a nonwoven fabric layer bonded thereto by means of a hot melt adhesive layer are embossed together and bonded to each other with the embossed pattern, thus exhibiting superior bonding strength, heat resistance, fire resistance, scratch resistance, shape stability, flexibility and wrinkling resistance. In the method of manufacturing such a decorative stainless steel rolled sheet, the rolled sheet can be mass produced at uniform quality using a continuous process.

5 Claims, 6 Drawing Sheets

(51) Int. Cl.
  *B32B 7/12* (2006.01)
  *B32B 38/08* (2006.01)
  *B32B 15/20* (2006.01)
  *B32B 15/18* (2006.01)
  *B32B 38/06* (2006.01)
  *B32B 5/02* (2006.01)
  *B32B 15/08* (2006.01)
  *B29C 65/00* (2006.01)
  *B29C 65/40* (2006.01)
  *B29C 65/52* (2006.01)
  *B29C 65/48* (2006.01)
  *B32B 37/12* (2006.01)

(56) References Cited

U.S. PATENT DOCUMENTS 4,999,259 A * 3/1991 Hashimoto et al. ........... 428/685
6,001,301 A * 12/1999 Kinoshita et al. ............. 264/510
6,652,908 B1 * 11/2003 Guldbrandsen et al. ... 427/208.8
2009/0084278 A1 * 4/2009 Masi et al. ...................... 101/32
2009/0269562 A1 * 10/2009 Roelofs et al. ................ 428/215

FOREIGN PATENT DOCUMENTS

JP  2521457 B2 * 8/1996
JP  2000345115 A * 12/2000

OTHER PUBLICATIONS

Machine translation of Japanese Patent Publication No. JP-2000345115A, originally published Dec. 2000, 8 pages.*

* cited by examiner

DECORATIVE STAINLESS STEEL ROLLED SHEET WITH EMBOSSED PATTERNS AND METHOD OF MANUFACTURING THE SAME

CROSS REFERENCE TO RELATED APPLICATION

The present application is a divisional application of U.S. application Ser. No. 12/901,798, filed Oct. 11, 2010, now U.S. Pat. No. 8,455,075.

BACKGROUND OF THE INVENTION

1. Field of the Invention

The present invention relates to a decorative stainless steel rolled sheet having an embossed pattern and a method of manufacturing the same. More particularly, the present invention relates to a decorative stainless steel rolled sheet having an embossed pattern, which comprises a continuous thin stainless steel sheet subjected to surface treatment such as nanoceramic coating or PVD (Physical Vapor Deposition) ionic coating and a release sheet alone or with a nonwoven fabric layer bonded to one side of the thin stainless steel sheet by means of a hot melt adhesive layer, which are embossed together, and to a method of manufacturing the same.

2. Description of the Related Art

Generally decorative sheets have been utilized as surface finishes for a variety of products that protect the products and impart the outer appearance thereof with various colors, patterns and textures.

For example, decorative sheets are widely employed as interior surface finishes in buildings, elevators, automobiles, ships and airplanes, or as surface finishes for a variety of pieces of furniture or electronic products.

Depending on the end use, the types of decorative sheets are the overlay type, wrapping type, membrane type, and edge type. Overlay type decorative sheets are generally used on the flat top of furniture, MDF (Medium Density Fiberboard) or particle board, and wrapping type decorative sheets are used on portions requiring curved processing such as a narrow chassis or molding.

Also, membrane type decorative sheets are applied to typical furniture having many curved portions or doors, and edge type decorative sheets are applied to corners of furniture or tables or lateral sides of upper sheets thereof. Recently, iron plate type decorative sheets are applied on the outer surfaces of electronic products or other iron plates.

Because conventional decorative sheets are mainly made of a synthetic resin, surface strength and wear resistance are low which undesirably leads to scratching. Also, even when such conventional decorative sheets are subjected to fireproofing surface treatment, they have low heat resistance and fire resistance and have a weak resistance to fire.

In order to impart decorative sheets with a metal texture, attempts to attach a metal foil to the bottom or top of a base sheet are being made these days.

Although methods of attaching a metal foil may impart the decorative sheet with a metal texture, they are problematic because it is difficult to form various designs including letters or figures on the metal foil provided in the form of a thin film, and also because flexibility may decrease and wrinkling may occur, making it difficult to manufacture the decorative sheet into a rolled sheet and to package and handle it.

Furthermore, when the decorative sheet is attached to a target, it may come off due to not being very flexible and wrinkling.

In particular, it is difficult to apply such a decorative sheet to recessed portions, protruding portions and curved portions of the target because it is not very flexible and because of wrinkling.

Korean Patent No. 0896623 discloses a metal textured decorative sheet and a method of manufacturing the same. Specifically, in the metal textured decorative sheet comprising a base sheet, a metal texture layer formed on the base sheet, a printing layer formed on the metal texture layer, and a transparent film formed on the printing layer, the metal texture layer which includes letters or figures is formed by printing metal ink containing metal particles on the base sheet, the metal ink comprising a dispersion of metal particles having a size of 1~100 nm, a binder, a solvent and a dispersant. As such, the metal ink may comprise, based on the total weight of the metal ink, 5.0~50.0 parts by weight of the metal particles, 10.0~60.0 parts by weight of the binder, 10.0~40.0 parts by weight of the solvent, and 0.05~5.0 parts by weight of the dispersant, in which the dispersant may be an alkylamine having a C4~12 alkyl group, an amide carboxylate, an aminocarboxylate or sodium citrate. Furthermore, the method of manufacturing the metal textured decorative sheet includes forming the metal texture layer on the base sheet thus obtaining a semi-finished product, layering the transparent film having the printing layer on the semi-finished product and then passing the semi-finished product through an emboss roll so as to be hot pressed thus manufacturing a desired sheet, in which the metal texture layer includes letters or figures formed by printing metal ink containing metal particles on the base sheet, the metal ink comprising a dispersion of metal particles having a size of 1~100 nm, a binder, a solvent and a dispersant. As such, the metal ink may comprise, based on the total weight of the metal ink, 5.0~50.0 parts by weight of the metal particles, 10.0~60.0 parts by weight of the binder, 10.0~40.0 parts by weight of the solvent, and 0.05~5.0 parts by weight of the dispersant, in which the dispersant may be an alkylamine having a C4~12 alkyl group, an amide carboxylate, an aminocarboxylate or sodium citrate.

The decorative sheet thus manufactured is advantageous because the metal texture layer is formed by printing the metal ink, thus embodying designs of various metal textures and ensuring flexibility, compared to a metal texture layer in metal foil form. However, this decorative sheet is disadvantageous because the transparent film which constitutes the uppermost part of the decorative sheet is made of a synthetic resin, and thus wear resistance becomes poor, and also because of low resistance to heat and fire, and thus the decorative sheet is weak to fire and may contaminate the environment when it is disposed of.

Moreover, such a decorative sheet is manufactured using a unit for producing the semi-finished product including the metal texture layer by printing the metal ink containing metal particles uniformly dispersed therein on the base sheet, a unit for forming the printing layer on the transparent film, and a unit for layering the transparent film on the semi-finished product to produce a desired sheet, undesirably making it difficult to control the manufacturing process and causing problems such as increased manufacturing cost and lowered productivity.

Also, because the metal particles contained in the metal ink cause the metal texture to be exhibited, inherent properties and texture of only the metal cannot naturally manifest themselves, undesirably degrading product value.

The present inventors carried out earnest work to solve the problems encountered in the related art and thus have discovered that a thin stainless steel sheet in which various surface processing treatments may be performed and which is lightweight and has superior corrosion resistance, wear resistance, heat resistance, fire resistance, processability and durability is preferably used as the decorative metal sheet.

However, typical thin stainless steel sheets, having a monotonous cold metal texture and being glossy, are unsuitable for use as a decorative surface finish.

Hence, provided as the decorative metal sheet is a thin stainless steel sheet subjected to matte surface treatment and having various colors and a thickness of about 0.05~0.15 mm.

Generally, a thin stainless steel sheet having a thickness of about 0.8~1.5 mm which was mainly subjected to matte surface treatment through a physical process using hairline brush, bead blast, vibration brush and so on is useful. However, in the case where a thin stainless steel sheet having a thickness of about 0.05~0.15 mm suitable for use as the decorative metal sheet is subjected to matte surface treatment using the above physical process, its surface may be undesirably damaged.

Also, when the surface of the thin stainless steel sheet which is glossy is subjected to inorganic coating using a nanoceramic ($SiO_2$, $SnO_2$, etc.) or ionic coating with titanium (Ti), chromium (Cr), zirconium (Zr) or the like using PVD, the surface roughness thereof may be reduced and a variety of colors may be obtained.

Furthermore, nanoceramic coating is performed by coating a nano material having a size of 10~20 nm using a spraying process and thus results in lower manufacturing cost than when using PVD, and also enables the use of an organic dye or a nano inorganic dye thus obtaining a wider variety of colors.

On the other hand, when ionic coating is performed using PVD, a material such as Ti, Cr, Zr or the like evaporates and its minute particles are applied on the surface of the stainless steel sheet in a high vacuum, thus achieving superior quality but undesirably causing higher manufacturing cost, compared to a wet process. The color thereof may be gold, bronze, black, etc., depending on the kind of gas injected when coating.

The nanoceramic coating which results in a coating thickness of about 20 μm or less or the PVD inorganic coating which results in a coating thickness of about 0.5~1.0 μm causes almost no damage to the coating layer upon post-processing such as bending or embossing, thus exhibiting a surface roughness and colors required of surface finishes of a variety of products.

According to tests by the present inventors, although the thin stainless steel sheet having a thickness of about 0.05~0.15 mm and subjected to nanoceramic coating or PVD ionic coating has no cushioning and thus may be processed to have an embossed pattern using an emboss roll composed of a positive pattern roll and a negative pattern roll corresponding thereto, it is difficult to exhibit an elaborate fine clear pattern, and also the use of the emboss roll composed of the positive pattern roll and the negative pattern roll makes the processing difficult, increases the manufacturing cost, and incurs a great amount of wear, undesirably resulting in a short service life.

Furthermore, even when the above thin stainless steel sheet is embossed to form the embossed pattern, it is poor in terms of scratch resistance, shape stability, flexibility and wrinkling resistance, and a smooth cut surface cannot be obtained when it is cut and it is difficult to package, handle and construct.

SUMMARY OF THE INVENTION

Leading to the present invention, intensive and thorough research into manufacturing of a decorative sheet from a thin stainless steel sheet having a thickness of about 0.05~0.15 mm and subjected to nanoceramic coating or PVD ionic coating resulted in the finding that a smooth roll is used, which may impart scratch resistance, shape stability, flexibility, wrinkling resistance and cushioning to the thin stainless steel sheet and also which may facilitate desired processing, may reduce the manufacturing cost and may generate a small amount of wear and thus may have a long service life, so that an embossed pattern which is more elaborate, finer and clearer than is the result of using a conventional negative pattern roll may be formed, and the resulting sheet may be widely utilized as an overlay type, wrapping type, membrane type or edge type surface finish without limitation of the surface state of various targets, thus satisfying not only physical and chemical properties required of a decorative sheet but also the expected aesthetic appearance, constructability and economic efficiency.

Accordingly, the present invention is intended to provide a decorative stainless steel rolled sheet having an embossed pattern, which comprises a thin stainless steel sheet subjected to surface treatment such as nanoceramic coating or PVD ionic coating and a release sheet alone or a nonwoven fabric layer and a release sheet in a sequence bonded to one side of the thin stainless steel sheet by means of a hot melt adhesive layer, which are embossed together and bonded to each other with the embossed pattern, thus exhibiting superior scratch resistance, shape stability, flexibility and wrinkling resistance, and also to provide a method of manufacturing the same.

An aspect of the present invention provides a decorative stainless steel rolled sheet having an embossed pattern, comprising a thin stainless steel sheet having a thickness of 0.05~0.15 mm and subjected to surface treatment including nanoceramic coating or PVD ionic coating, and a release sheet bonded to one side of the thin stainless steel sheet by means of a hot melt adhesive layer, wherein the thin stainless steel sheet, the hot melt adhesive layer and the release sheet are embossed together and bonded to each other with the embossed pattern.

In this aspect, a nonwoven fabric layer may be further bonded between the hot melt adhesive layer and the release sheet.

In this aspect, the hot melt adhesive layer may comprise a moisture hardening type hot melt adhesive.

In this aspect, the hot melt adhesive layer may have a thickness of 0.05~0.12 mm.

In this aspect, the release sheet may comprise a polyethylene or polypropylene film having a thickness of 0.05~0.10 mm.

In this aspect, the embossed pattern may have a depth of 50~200 μm.

In this aspect, the nonwoven fabric layer may have a thickness of 0.05~0.10 mm.

In this aspect, a double-sided adhesive sheet having release paper on one side thereof may be bonded to the hardened hot melt adhesive layer, with the release sheet having been removed.

In this aspect, an additional adhesive layer may be formed on the hardened hot melt adhesive layer and a sheet member comprising an aluminum sheet or a plating steel sheet having a thickness of 0.2~1.2 mm may be bonded onto the additional adhesive layer, with the release sheet having been removed.

Another aspect of the present invention provides a method of manufacturing a decorative stainless steel rolled sheet having an embossed pattern, comprising unwinding a thin stainless steel sheet having a thickness of 0.05~0.15 mm and subjected to surface treatment including nanoceramic coating or PVD ionic coating from a thin stainless steel sheet take-up roll and feeding it between first feed rolls, applying a hot melt adhesive on one side of the thin stainless steel sheet, which moves by means of the first feed rolls, using an adhesive feed roll and the first feed rolls, thus forming a hot melt adhesive layer on one side of the thin stainless steel sheet, unwinding a release sheet having a thickness of 0.05~0.10 mm and made of a polyethylene or polypropylene film from a release sheet take-up roll and feeding it between second feed rolls so that it is bonded onto the hot melt adhesive layer formed on one side of the thin stainless steel sheet, embossing the thin stainless steel sheet and the release sheet bonded thereto by means of the hot melt adhesive layer using an emboss roll composed of a positive pattern roll and a smooth roll, thus forming the embossed pattern, and winding the resulting product in rolled sheet form on a take-up roll.

In this aspect, the method may further comprise bonding a nonwoven fabric layer having a thickness of 0.05~0.10 mm on the hot melt adhesive layer formed on one side of the thin stainless steel sheet.

In this aspect, the hot melt adhesive layer may be formed to have a thickness of 0.05~0.12 mm.

In this aspect, the embossed pattern may be formed to have a depth of 50~200 μm.

In this aspect, the method may further comprise bonding a double-sided adhesive sheet having release paper on one side thereof to the hardened hot melt adhesive layer, after the release sheet has been removed.

In this aspect, the method may further comprise forming an additional adhesive layer on the hardened hot melt adhesive layer and bonding a sheet member comprising an aluminum sheet or a plating steel sheet having a thickness of 0.2~1.2 mm onto the additional adhesive layer, after the release sheet has been removed.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Hereinafter, a detailed description will be given of the present invention with reference to the appended drawings.

Figure 1:
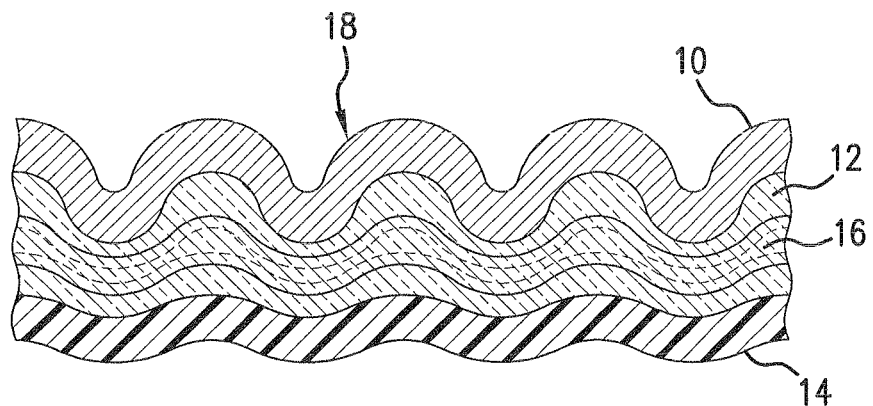
FIG. 1 is an enlarged cross-sectional view showing a rolled sheet according to an embodiment of the present invention.

According to the present invention, a decorative thin stainless steel rolled sheet having an embossed pattern is configured such that, as illustrated in FIG. 1, a release sheet 14 or a nonwoven fabric layer 16 and a release sheet 14 in a sequence are bonded to the back side of a thin stainless steel sheet 10 subjected to surface treatment such as nanoceramic coating or PVD ionic coating by means of a hot melt adhesive layer 12, in which all of the thin stainless steel sheet 10, the hot melt adhesive layer 12 and the release sheet 14, or all of the thin stainless steel sheet 10, the hot melt adhesive layer 12, the nonwoven fabric layer 16 and the release sheet 14, are embossed together, whereby the thin stainless steel sheet 10, the hot melt adhesive layer 12 and the release sheet 14, or the thin stainless steel sheet 10, the hot melt adhesive layer 12, the nonwoven fabric layer 16 and the release sheet 14, are bonded to each other with the embossed pattern 18.

In the present invention, the thin stainless steel sheet 10 may have a thickness of about 0.05~0.15 mm. If the thickness thereof is less than 0.05 mm, such a thin sheet is difficult to produce and may be expensive. In contrast, if the thickness thereof exceeds 0.15 mm, the strength of the thin sheet may increase, making it difficult to perform embossing and making it impossible to obtain a fine clear pattern.

The hot melt adhesive layer 12 may have a thickness of about 0.05~0.12 mm. If the thickness thereof is less than 0.05 mm, adhesive force may weaken and a cushioning effect which is applied to the thin stainless steel sheet 10 upon embossing may become poor. In contrast, if the thickness thereof exceeds 0.12 mm, the adhesive may flow out of the edge of the rolled sheet when the thin stainless steel sheet 10 and the release sheet 14 are bonded, undesirably degrading the quality of a product.

The nonwoven fabric layer 16 may have a thickness of about 0.95~0.10 mm. If the thickness thereof is less than 0.05 mm, a cushioning effect which is applied to the thin stainless steel sheet 10 upon embossing may become poor. In contrast, if the thickness thereof exceeds 0.10 mm, the adhesive of the hot melt adhesive layer 12 may be excessively absorbed by such a nonwoven fabric layer, undesirably weakening the adhesive force of the hot melt adhesive layer 12.

The release sheet 14 is a polyethylene (PE) or polypropylene (PP) film having release performance and flexibility and may have a thickness of about 0.05~0.10 mm depending on the depth of the embossed pattern 18, namely, whether the pattern is shallow or deep. If the thickness thereof is less than 0.05 mm, this sheet may be easily damaged upon embossing or handling, making it impossible to effectively protect the product, and as well, a cushioning effect which is applied to the thin stainless steel sheet 10 upon embossing may become poor. In contrast, if the thickness thereof exceeds 0.10 mm, there are no advantageous effects in terms of cost.

The depth of the embossed pattern 18 may be set to about 50~200 μm. If the depth thereof is less than 50 μm, a clear pattern cannot be obtained. In contrast, if the depth thereof exceeds 200 μm, the thin stainless steel sheet 10 may crack or be deformed.

In the present invention, when the thin stainless steel sheet 10 and the release sheet 14 or the nonwoven fabric layer 16 and the release sheet 14 bonded to the back side of the thin stainless steel sheet 10 by means of the hot melt adhesive layer 12 are embossed, it is preferable that the surface of the thin stainless steel sheet 10 is pressed to form the embossed pattern 18 before completely hardening the adhesive of the hot melt adhesive layer 12. The reason is that a cushioning effect required to perform embossing may be sufficiently provided by the hot melt adhesive layer 12 and the release sheet 14 or the nonwoven fabric layer 16 and the release sheet 14 before the bonded portion between the thin stainless steel sheet 10 and the hot melt adhesive layer 12, the nonwoven fabric layer 16 into which the adhesive of the hot melt adhesive layer 12 permeates, and the bonded portion between the nonwoven fabric layer 16 and the release sheet 14 have completely hardened, so that the clear embossed pattern 18 may be obtained with embossing being carried out just one time.

The hot melt adhesive layer 12 is preferably made of a moisture hardening type hot melt adhesive, which is hardened by crosslinking isocyanate which persists in the adhesive even after cooling with moisture in the atmosphere or in the subject thus increasing the molecular weight resulting in high heat resistance and also which has lower initial adhesive force to the subject before crosslinking between isocyanate and moisture, compared to typical hot melt adhesives. This is because, when the moisture hardening type hot melt adhesive is used to adhere the nonwoven fabric layer 16 and the release sheet 14 to the back side of the thin stainless steel sheet 10, the initial adhesive force is lower than that of a general hot melt adhesive but a cushioning effect required to perform embossing, namely, elastic resilience, may increase, thus enabling a clearer embossed pattern to be formed at once. Furthermore, because hardening is carried out by the crosslinking between moisture in the air present in the nonwoven fabric layer 16 and the isocyanate of the moisture hardening type hot melt adhesive which permeates into the nonwoven fabric layer 16, the thin stainless steel sheet 10 and the nonwoven fabric layer 16 may be more securely bonded to each other, resulting in a decorative stainless steel rolled sheet having superior scratch resistance, shape stability, flexibility and cushioning performance, all of which were difficult to obtain when using only the thin stainless steel sheet 10.

In the present invention, when the nonwoven fabric layer 16 into which the hot melt adhesive permeates is used, less hot melt adhesive may be used compared to when a hot melt adhesive is simply applied on the thin stainless steel sheet 10, and as well, the adhesive may be uniformly distributed on the stainless steel sheet 10, thus reducing the manufacturing cost and enhancing the bonding strength.

Figure 2:
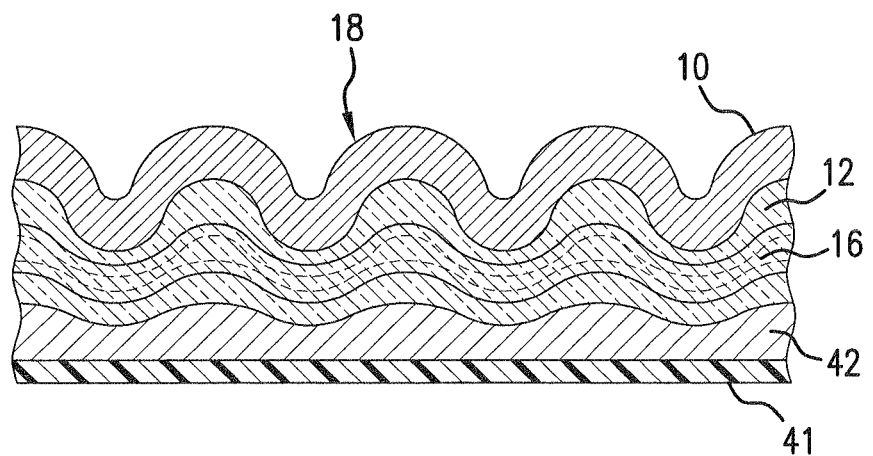
FIG. 2 is an enlarged cross-sectional view showing a rolled sheet according to another embodiment of the present invention.

The stainless steel rolled sheet having an embossed pattern according to the present invention is attached to a target using an adhesive after the release sheet 14 has been removed therefrom. In order to attach this rolled sheet to the target without the use of an adhesive, as illustrated in FIG. 2, a double-sided adhesive sheet 42 having release paper 41 formed on only one side thereof may be bonded to the hot melt adhesive layer 12, with the release sheet 14 having been removed.

Figure 3:
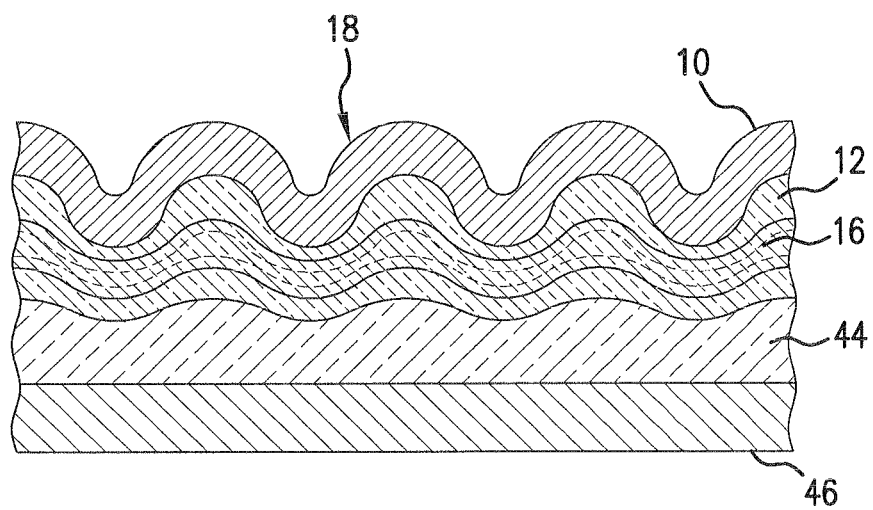
FIG. 3 is an enlarged cross-sectional view showing a rolled sheet according to a further embodiment of the present invention.

In addition, in order to use the stainless steel rolled sheet having an embossed pattern according to the present invention as an interior surface finish that must have higher fire resistance and durability, as illustrated in FIG. 3, an additional adhesive layer 44 may be formed on the hardened hot melt adhesive layer 12 and a sheet member 46 comprising an aluminum sheet or a plating steel sheet having a thickness of about 0.2~1.2 mm may be bonded to the additional adhesive layer 44, with the release sheet 14 having been removed.

If the thickness of the sheet member 46 is less than 0.2 mm, fire resistance and durability may become insufficient. In contrast, if the thickness thereof exceeds 1.2 mm, flexibility may become poor.

In the decorative stainless steel rolled sheet having an embossed pattern according to the present invention, when the embossed pattern 18 is formed by embossing the surface of the thin stainless steel sheet 10, the contact surfaces of all of the thin stainless steel sheet 10, the hot melt adhesive layer 12, the nonwoven fabric layer 16 and the release sheet 14 that will be removed upon use may be bonded to each other with the embossed pattern, thus enlarging their bonding area to thereby greatly enhance bonding strength, so that they do not peel away from each other due to thermal shrinkage or expansion or such external forces as a bending load, and so that their surface strength may be enhanced. Accordingly, superior heat resistance, fire resistance, scratch resistance, shape stability flexibility and wrinkling resistance may be obtained, such that not only physical and chemical properties required of a decorative sheet but also the aesthetic appearance, constructability and economic efficiency thereof may become satisfactory.

A method of manufacturing the decorative stainless steel rolled sheet according to the present invention is described below by means of the following examples.

EXAMPLE 1

Figure 4:
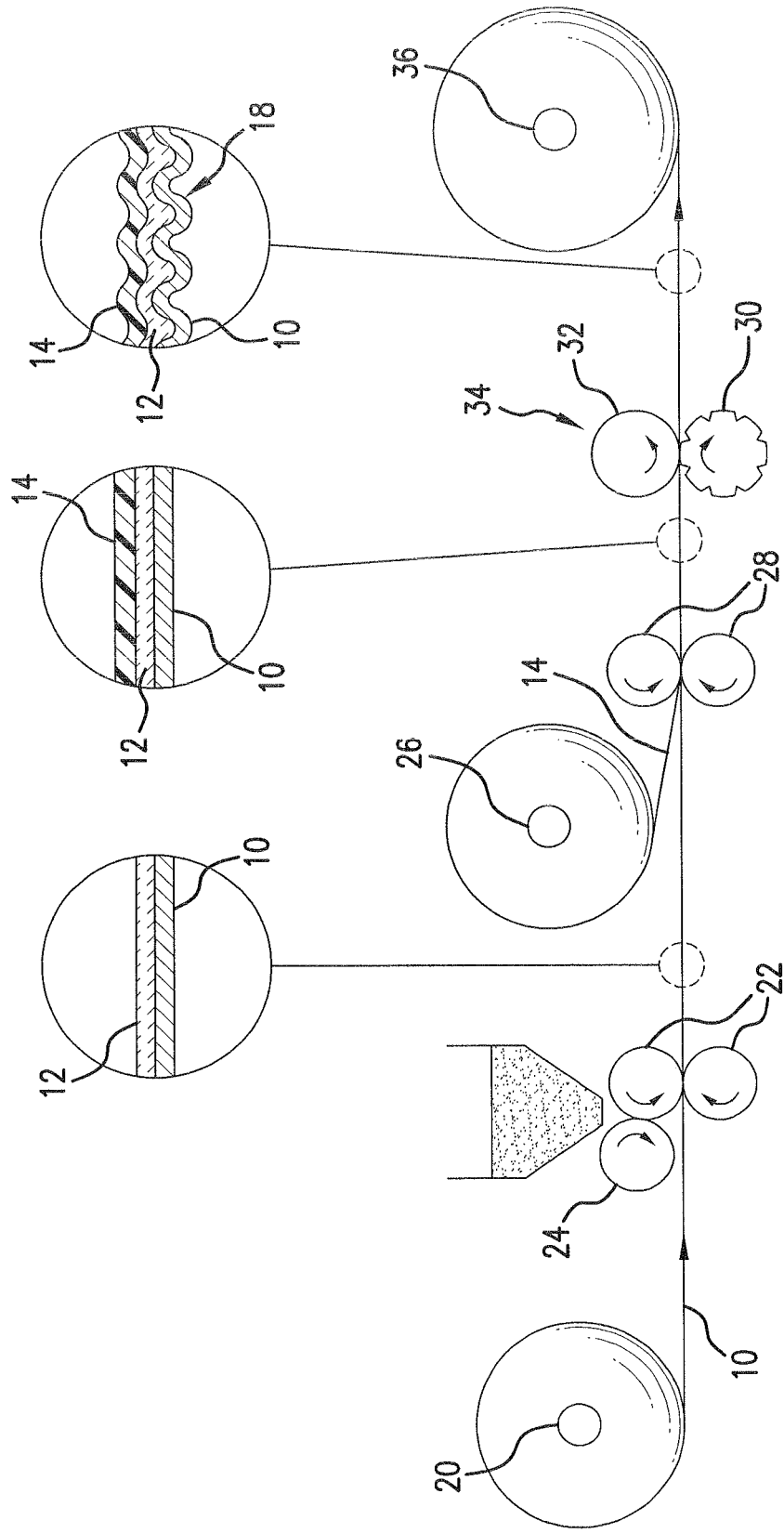
FIG. 4 is a schematic view showing a process of manufacturing a rolled sheet according to an embodiment of the present invention.

As illustrated in FIG. 4, a decorative stainless steel rolled sheet having an embossed pattern according to the present invention was manufactured by unwinding a thin stainless steel sheet 10 having a thickness of 0.05~0.15 mm and subjected to surface treatment such as nanoceramic coating or PVD ionic coating from a thin stainless steel sheet take-up roll 20 and feeding it between first feed rolls 22, applying a hot melt adhesive on one side of the thin stainless steel sheet 10, which moves by means of the first feed rolls 22, using an adhesive feed roll 24 and the first feed rolls 22, thus forming a hot melt adhesive layer 12 on one side of the thin stainless steel sheet 10, unwinding a release sheet 14 having a thickness of 0.05~0.10 mm and made of a PE or PP film from a release sheet take-up roll 26 and feeding it between second feed rolls 28 so that it is bonded onto the hot melt adhesive layer 12 formed on one side of the thin stainless steel sheet 10, embossing the thin stainless steel sheet 10 and the release sheet 14 bonded thereto by means of the hot melt adhesive layer 12 using an emboss roll 34 composed of a positive pattern roll 30 and a smooth roll 32 thus imparting an embossed pattern 18, and winding the resulting product in rolled sheet form on a take-up roll 36.

As such, the thickness of the hot melt adhesive layer 12 was 0.05~0.12 mm and the depth of the embossed pattern 18 was 50~200 μm, and the embossing was performed before the hot melt adhesive layer 12 had completely hardened.

EXAMPLE 2

Figure 5:
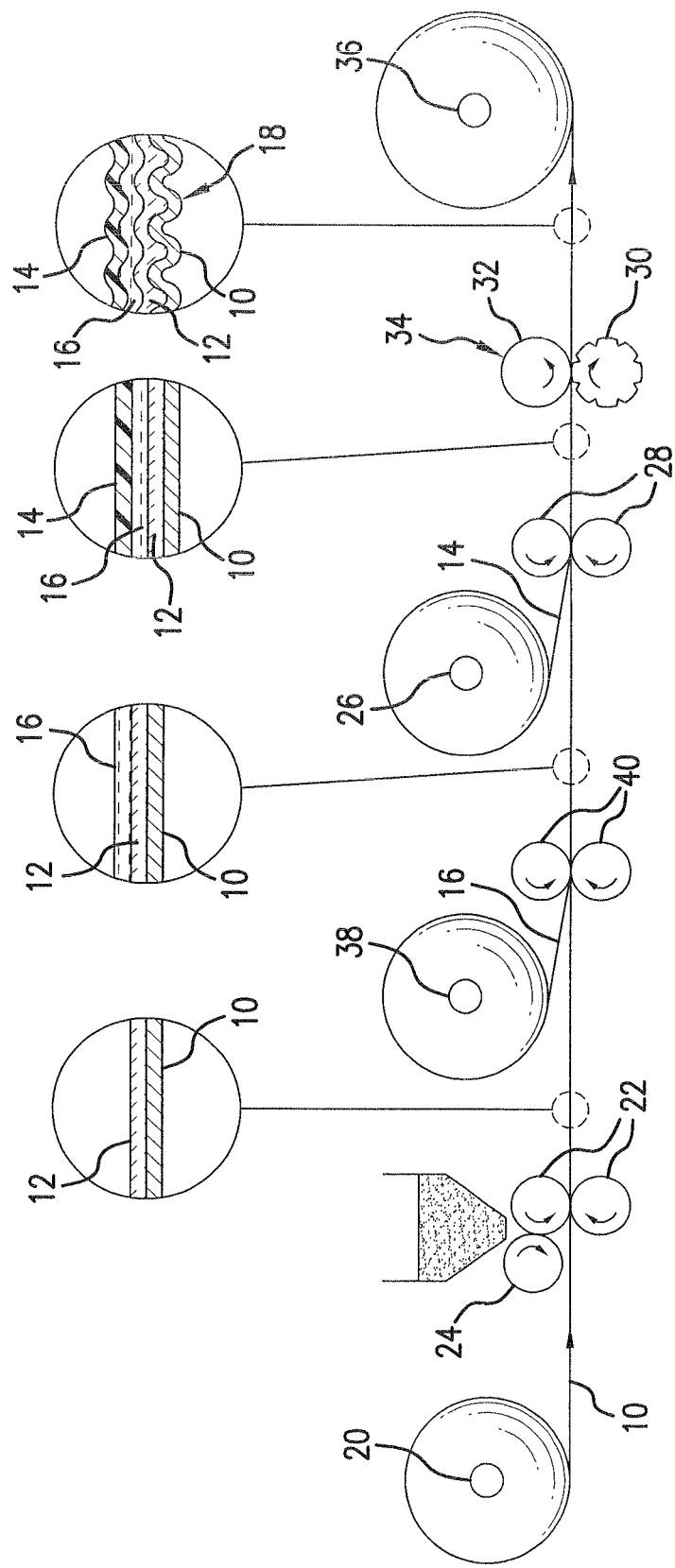
FIG. 5 is a schematic view showing a process of manufacturing a rolled sheet according to another embodiment of the present invention.

As illustrated in FIG. 5, a decorative stainless steel rolled sheet having an embossed pattern was manufactured in the same manner as in Example 1, with the exception that a nonwoven fabric layer 16 having a thickness of 0.05~0.10 mm was unwound from a nonwoven fabric take-up roll 38 and fed between third feed rolls 40 so that it was bonded onto the hot melt adhesive layer 12 formed on one side of the thin stainless steel sheet 10 and then a release sheet 14 was bonded onto the nonwoven fabric layer 16 using the adhesive flowing out of the nonwoven fabric layer 16.

The decorative stainless steel rolled sheet having an embossed pattern manufactured in Example 1, 2 is advantageous because it has surface roughness and various colors required of surface finishes of a variety of products thanks to the surface treatment such as nanoceramic coating or PVD ionic coating. Also, the decorative stainless steel rolled sheet, which results from forming the hot melt adhesive layer 12 on one side of the thin stainless steel sheet 10 which is continuously fed, bonding the release sheet 14 which is continuously fed or the nonwoven fabric layer 16 and the release sheet in a sequence which are continuously fed to the adhesive layer, performing embossing thus forming the embossed pattern 18, and winding the resulting product in rolled sheet form, can be mass produced at lower cost and uniform quality.

Also the decorative stainless steel rolled sheet according to the present invention can satisfy not only physical and chemical properties required of surface finishes of a variety of products but also is satisfactory with respect to aesthetic appearance, constructability and economic efficiency.

Figure 6:
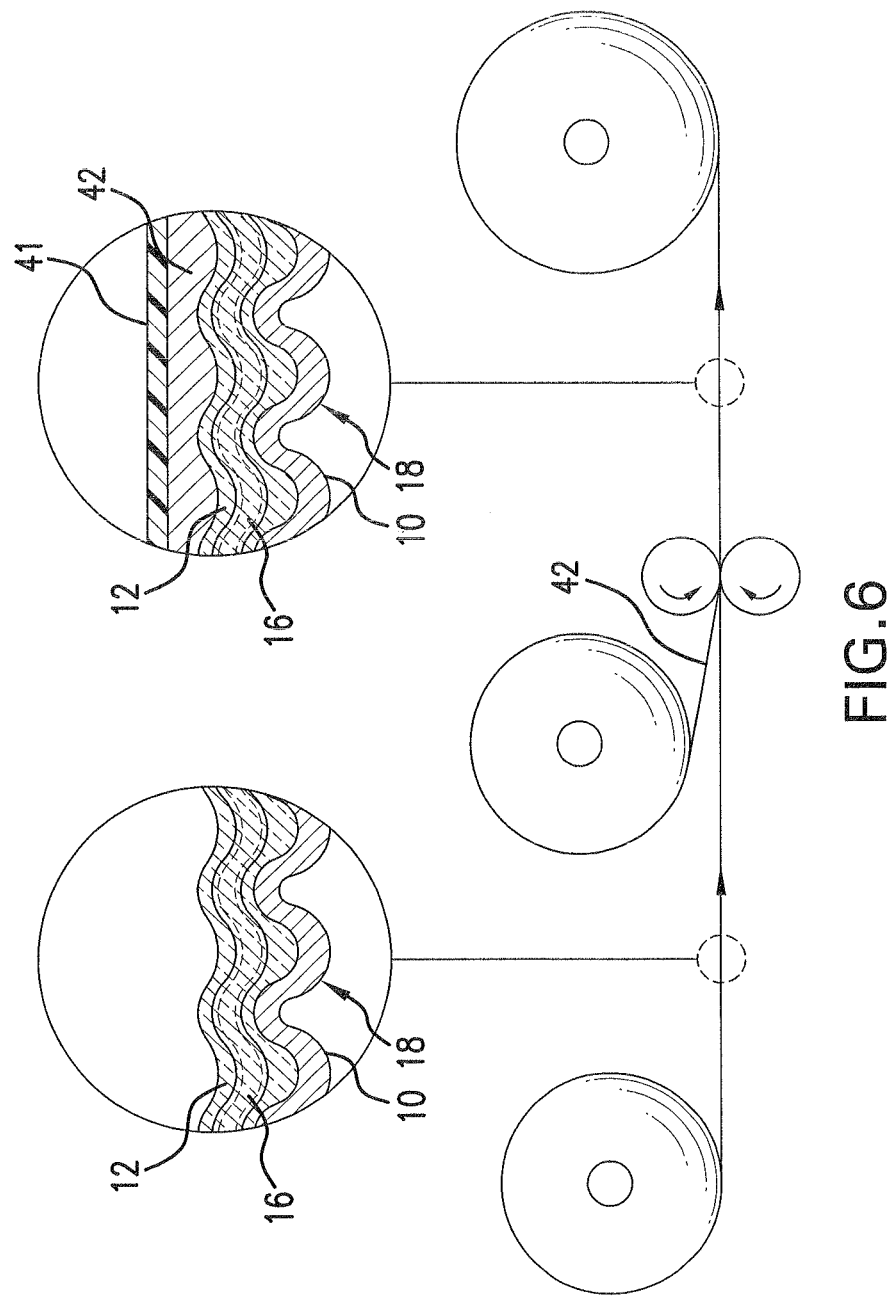
FIG. 6 is a schematic view showing a process of manufacturing a rolled sheet according to a further embodiment of the present invention.

Also, the decorative stainless steel rolled sheet according to the present invention, which is used in a manner of attaching it to a target using an adhesive after the release sheet 14 has been removed therefrom, may be attached to a target without the use of an adhesive depending on the environment and conditions of use. Specifically, as illustrated in FIG. 6, such a rolled sheet may be manufactured by bonding a double-sided adhesive sheet 42 having release paper 41 formed on one side thereof to the hardened hot melt adhesive layer 12, after the release sheet 14 has been removed from the rolled sheet of Example 1, 2.

Figure 7:
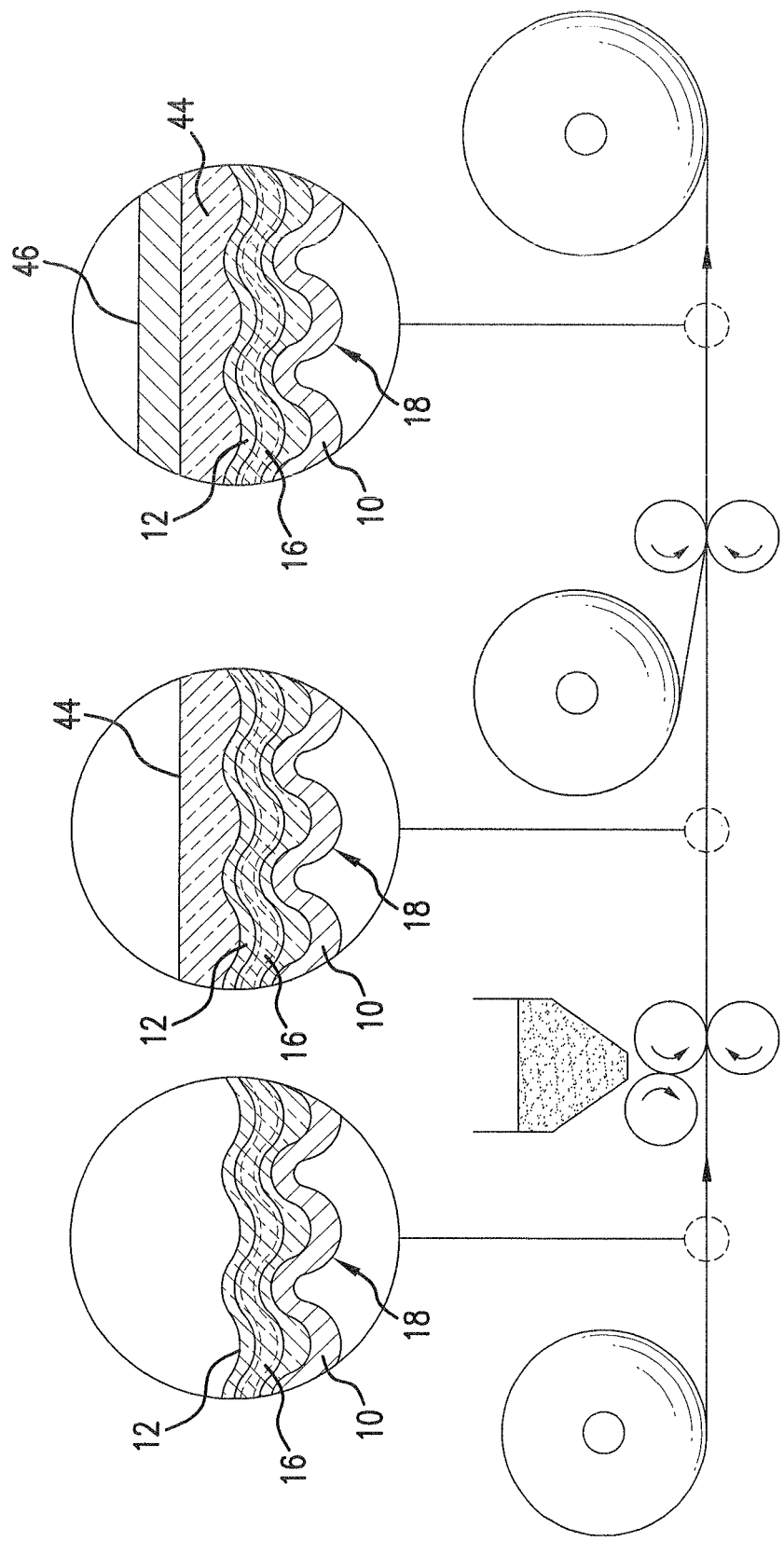
FIG. 7 is a schematic view showing a process of manufacturing a rolled sheet according to still a further embodiment of the present invention.

In addition, as illustrated in FIG. 7, in order to use the rolled sheet according to the present invention as an interior surface finish requiring superior fire resistance and durability, such a rolled sheet may be manufactured by forming an additional adhesive layer 44 on the hardened hot melt adhesive layer 12, attaching a sheet member 46 composed of an Al sheet or a plating steel sheet having a thickness of 0.2~1.2 mm to the additional adhesive layer 44, and winding the resulting product, after the release sheet 14 has been removed from the rolled sheet of Example 1, 2.

As described hereinbefore, the present invention provides a decorative stainless steel rolled sheet having an embossed pattern and a method of manufacturing the same. According to the present invention, the decorative stainless steel rolled sheet having an embossed pattern is advantageous because a thin stainless steel sheet having a thickness of 0.05~0.15 mm and subjected to surface treatment such as nanoceramic coating or PVD ionic coating resulting in various colors and a release sheet bonded to one side of the thin stainless steel sheet by means of a hot melt adhesive layer are embossed together and thus bonded to each other with the embossed pattern, and thereby can manifest high bonding strength and do not peel away from each other due to thermal shrinkage or expansion or such external forces as a bending load and also can have enhanced surface strength, so that superior heat resistance, fire resistance, scratch resistance, shape stability, flexibility and wrinkling resistance can be obtained, thus satisfying not only physical and chemical properties required of a decorative sheet but also the expected aesthetic appearance, constructability and economic efficiency.

According to the present invention, the method of manufacturing the decorative stainless steel rolled sheet is advantageous because the decorative rolled sheet can be mass produced at low cost and uniform quality using a continuous process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a decorative stainless steel rolled sheet having an embossed pattern, comprising:
    unwinding a thin stainless steel sheet, having a thickness of 0.05 to about 0.15 mm and subjected to a surface treatment having selected from the group consisting of nanoceramic coating and PVD (Physical Vapor Deposition) ionic coating, from a thin stainless steel sheet take-up roll and feeding it between first feed rolls;
    applying a hot melt adhesive on one side of the thin stainless steel sheet, which moves by means of the first feed rolls, using an adhesive feed roll and the first feed rolls, thus forming a hot melt adhesive layer on one side of the thin stainless steel sheet;
    unwinding a release sheet having a thickness of 0.05 to about 0.10 mm and made of a polyethylene or polypropylene film from a release sheet take-up roll and feeding it between second feed rolls so that it is bonded onto the hot melt adhesive layer formed on one side of the thin stainless steel sheet;
    embossing the thin stainless steel sheet and the release sheet bonded thereto by means of the hot melt adhesive layer using an emboss roll composed of a positive pattern roll and a smooth roll, thus forming the embossed pattern;
    winding a resulting product in rolled sheet form on a take-up roll; and
    bonding a double-sided adhesive sheet having release paper on one side thereof to the hardened hot melt adhesive layer, after the release sheet has been removed.

2. The method as set forth in claim 1, further comprising bonding a nonwoven fabric layer having a thickness of 0.05 to about 10 mm onto the hot melt adhesive layer formed on one side of the thin stainless steel sheet.

3. The method as set forth in claim 1, wherein the hot melt adhesive layer is formed to have a thickness of 0.05 to about 0.012 mm.

4. The method as set forth in claim 1, wherein the embossed pattern is formed to have a depth of 50 to about 200 μm.

5. A method of manufacturing a decorative stainless steel rolled sheet having an embossed pattern, comprising:
    unwinding a thin stainless steel sheet, having a thickness of 0.05 to about 0.15 mm and subjected to a surface treatment having selected from the group consisting of nanoceramic coating and PVD (Physical Vapor Deposition) ionic coating, from a thin stainless steel sheet take-up roll and feeding it between first feed rolls;
    applying a hot melt adhesive on one side of the thin stainless steel sheet, which moves by means of the first feed rolls, using an adhesive feed roll and the first feed rolls, thus forming a hot melt adhesive layer on one side of the thin stainless steel sheet;
    unwinding a release sheet having a thickness of 0.05 to about 0.10 mm and made of a polyethylene or polypropylene film from a release sheet take-up roll and feeding it between second feed rolls so that it is bonded onto the hot melt adhesive layer formed on one side of the thin stainless steel sheet;
    embossing the thin stainless steel sheet and the release sheet bonded thereto by means of the hot melt adhesive layer using an emboss roll composed of a positive pattern roll and a smooth roll, thus forming the embossed pattern;
    winding a resulting product in rolled sheet form on a take-up roll; and
    forming an additional adhesive layer on the hardened hot melt adhesive layer and bonding a sheet member comprising an aluminum sheet or a plating steel sheet having a thickness of 0.2 to about 1.2 mm onto the additional adhesive layer, after the release sheet has been removed.

* * * * *